C. C. St. Clair's Imp'd Spectacles.

No. 104656

PATENTED JUN 21 1870

Attest.
Samuel J. Spray
Frederick Eberts

Inventor.
Colin C. St. Clair
per Attorney
Thos. S. Sprague

United States Patent Office.

COLIN CREE ST. CLAIR, OF DETROIT, MICHIGAN.

Letters Patent No. 104,656, dated June 21, 1870.

IMPROVEMENT IN SPECTACLES.

The Schedule referred to in these Letters Patent and making part of the same.

*To whom it may concern:*

Be it known that I, COLIN CREE ST. CLAIR, of Detroit, in the county of Wayne and State of Michigan, have invented a new and useful Improvement in Spectacles; and I do declare that the following is a true and accurate description thereof, reference being had to the accompanying drawing, and to the letters of reference marked thereon and being a part of this specification, in which—

Figure 1:
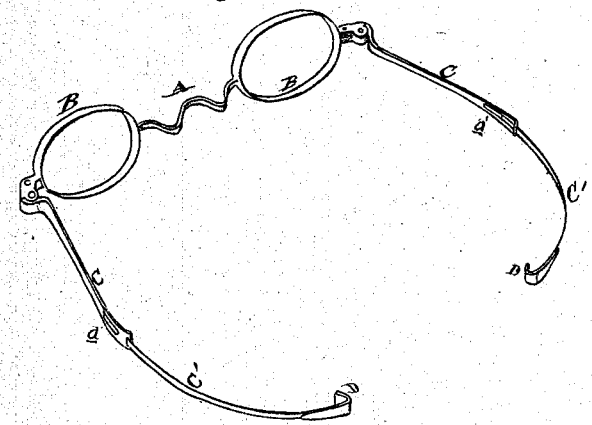
Figure 2:
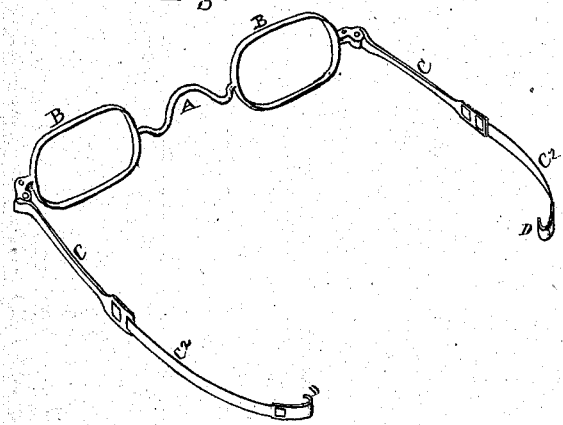

Figure 1 is a perspective view of a pair of spectacles provided with my improved bows, and Figure 2 is a similar view of another pair, showing a modification of the bows and a projecting bridge.

Like letters indicate like parts in each figure.

The nature of this invention relates to an improvement in the construction of spectacles, and It consists in the employment of hooks at the ends of the bows, which hooks enter the ears of the wearer, engaging with the cartilage in the upper and fore part of the ear, and thus firmly hold the spectacles in place in the plane of vision.

Also, in the peculiar construction of the bridge-piece, in such a manner that, while the same may be held firmly up against the bridge of the wearer's nose, the glasses are carried forward, so as not to be swept by his eye-lashes, thereby avoiding the frequent necessity of removing the spectacles to wipe the glasses.

In the drawing—

A represents in fig. 1 the bridge-piece of a pair of reversible spectacles, connecting the frames B, to the ends of which are hinged the bows C.

To the ends of the bows are connected light and elastic metal extensions C', having a slight movement in a short slot, a, in the ends of each bow.

To the ends of the extensions are attached the hooks D, which engage with the cartilage of the ear, and thereby firmly retain the spectacles in position, with the bridge-piece pressing against the highest or vertical portion of the bridge of the wearer's nose.

When once adjusted to their proper positions in the slots, the extensions are not to be moved therein, but should have their rivets tightened in place.

It will be noticed that the bridge-piece in fig. 1 is not curved out of a horizontal plane, but that the central part is curved outward, to set around the bridge of the nose, while the ends are curved forward again, so as to carry the glasses out of the reach of the eye-lashes.

With this form of bridge-piece, the spectacles may be worn either side up.

In fig. 2 is shown a modification of the bridge-piece described. In this case the spectacles are not reversible, as the bridge-piece is bent in its middle upward and backward, bringing the centers of the glasses slightly below the plane of the eyes, to adapt them for use in work which requires the wearer to look down upon it, as in writing.

By curving the bridge-piece to the rear, the glasses are carried further away from the eyes, allowing of a free circulation of air between the eyes and glasses, which is a great relief to the wearer in warm weather, and prevents them from being dimmed by perspiration dropping on them from the forehead, in stooping.

In this figure, the extensions C' of the bows, shown in fig. 1, are replaced with elastic webbing C², to the ends of which the ear-hooks D are secured, dispensing with the slots in the bows, for adjusting the extensions C', and lessening the cost of the spectacles.

What I claim as my invention, and desire to secure by Letters Patent, is—

1. In spectacles, the ear-hooks D, as and for the purpose set forth.

2. The bridge-piece A, having its ends turned outward from the body thereof, so as to throw the glass-frames away from the wearer's eyes, substantially as described.

COLIN CREE ST. CLAIR.

Witnesses:
SAM. J. SPRAY,
FREDERICK EBERTS.